(12) United States Patent
Rubanovich

(10) Patent No.: US 8,898,584 B2
(45) Date of Patent: Nov. 25, 2014

(54) DYNAMIC ALTERATION OF INPUT MODE ON TOUCH SCREEN DEVICE

(75) Inventor: Dan Rubanovich, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 511 days.

(21) Appl. No.: 12/541,560

(22) Filed: Aug. 14, 2009

(65) Prior Publication Data
US 2010/0088626 A1 Apr. 8, 2010

Related U.S. Application Data

(60) Provisional application No. 61/103,482, filed on Oct. 7, 2008.

(51) Int. Cl.
*G06F 3/048* (2013.01)
*G06F 3/0488* (2013.01)
*G06F 3/023* (2006.01)
*G06F 1/16* (2006.01)

(52) U.S. Cl.
CPC .......... *G06F 3/04886* (2013.01); *G06F 3/0237* (2013.01); *G06F 2200/1637* (2013.01); *G06F 1/1626* (2013.01)
USPC ...................................... 715/773

(58) Field of Classification Search
USPC ...................................... 715/773
See application file for complete search history.

(56) References Cited

U.S. PATENT DOCUMENTS

| | | | |
|---|---|---|---|
| 5,818,437 A * | 10/1998 | Grover et al. | 715/811 |
| 6,392,640 B1 | 5/2002 | Will | |
| 7,886,233 B2 * | 2/2011 | Rainisto et al. | 715/773 |
| 7,957,955 B2 * | 6/2011 | Christie et al. | 704/9 |
| 8,185,841 B2 * | 5/2012 | Rainisto | 715/773 |
| 2006/0274051 A1 * | 12/2006 | Longe et al. | 345/173 |
| 2007/0061753 A1 * | 3/2007 | Ng et al. | 715/816 |
| 2007/0074131 A1 * | 3/2007 | Assadollahi | 715/816 |
| 2007/0079239 A1 | 4/2007 | Ghassabian | |
| 2007/0085759 A1 * | 4/2007 | Lee et al. | 345/1.1 |
| 2007/0157122 A1 * | 7/2007 | Williams | 715/816 |
| 2008/0080919 A1 | 4/2008 | Rak et al. | |
| 2008/0141125 A1 * | 6/2008 | Ghassabian | 715/261 |
| 2009/0249232 A1 * | 10/2009 | Lundy et al. | 715/764 |

FOREIGN PATENT DOCUMENTS

| | | |
|---|---|---|
| WO | 98/33111 A1 | 7/1998 |
| WO | 2006/020992 A2 | 2/2006 |

OTHER PUBLICATIONS

PCT International Preliminary Report on Patentability, dated Apr. 12, 2011, mailed by the International Bureau of WIPO, for International Application No. PCT/CA2009/001129 (7 page).
Office Action, dated May 28, 2012, mailed by Canadian Intellectual Property Office, in Canadian Patent Application No. 2,704,838 (3 pages).
Examination Report, dated Apr. 13, 2012, mailed by UK Intellectual Property Office, in UK Patent Application No. GB1007691.7 (5 pages).

* cited by examiner

*Primary Examiner* — William Bashore
*Assistant Examiner* — Hien Duong
(74) *Attorney, Agent, or Firm* — Finnegan, Henderson, Farabow, Garrett & Dunner LLP

(57) ABSTRACT

A mobile electronic device includes a touch sensitive display and enables text input to be provided in either a reduced keyboard ambiguous text input mode or in a full keyboard unambiguous text input mode and advantageously enables uncommitted text entered in the ambiguous input mode to be automatically committed when switching into the unambiguous input mode. An improved method employs the mobile electronic device.

9 Claims, 2 Drawing Sheets

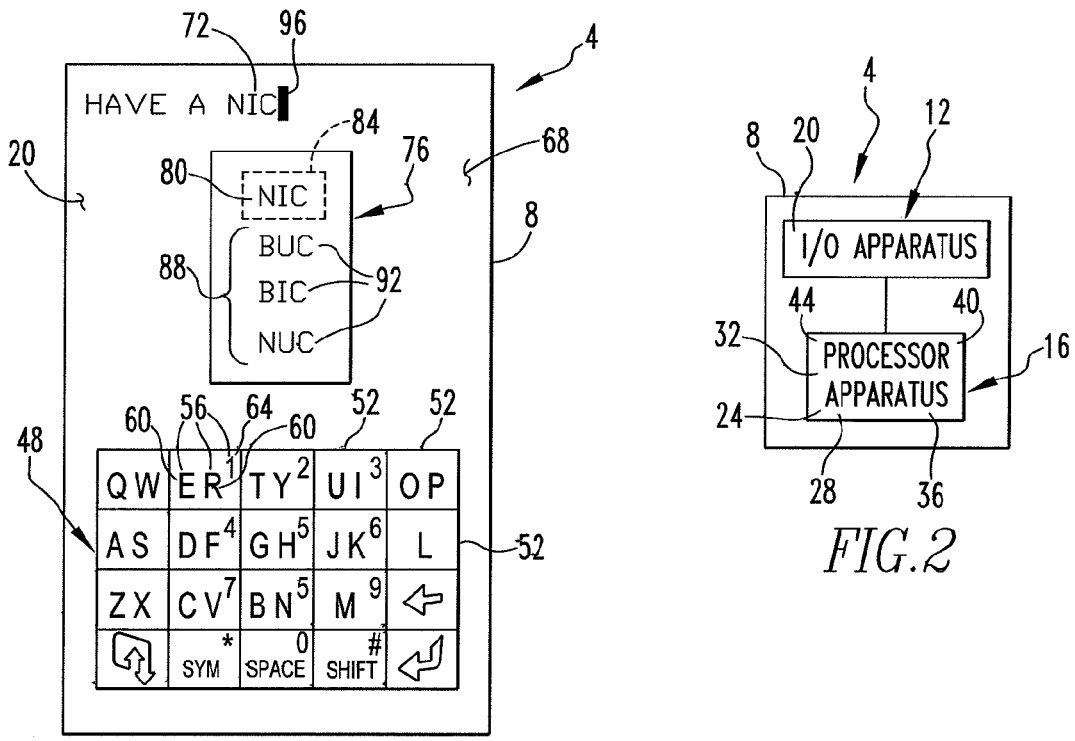
FIG.1
FIG.2
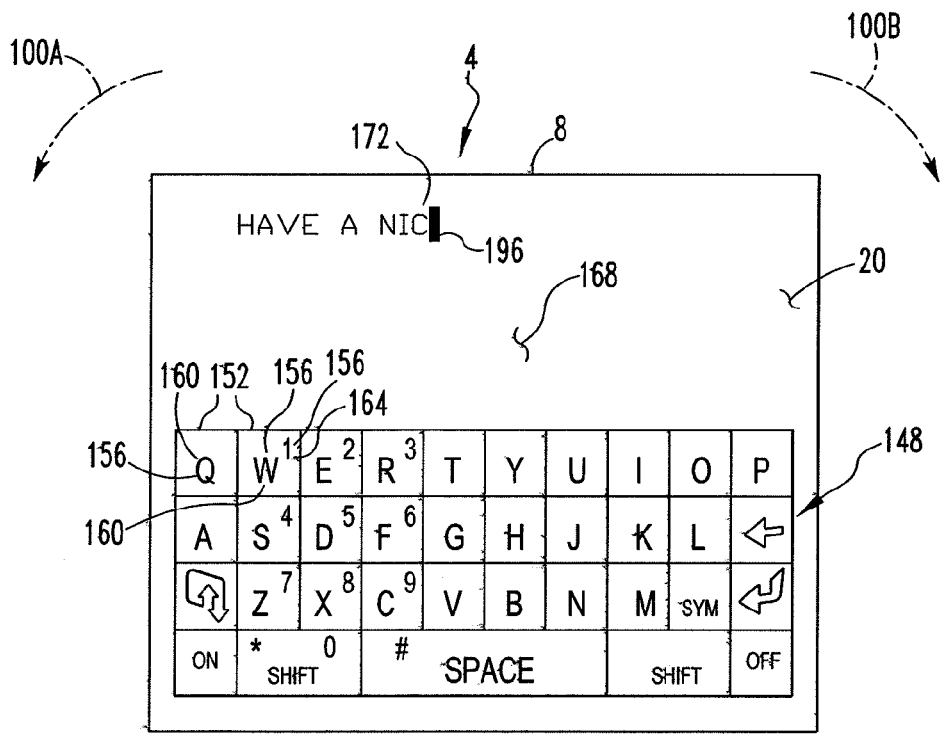
FIG.3

DYNAMIC ALTERATION OF INPUT MODE ON TOUCH SCREEN DEVICE

CROSS-REFERENCE TO RELATED APPLICATION

The present application claims priority to U.S. Provisional Application Ser. No. 61/103,482, filed Oct. 7, 2008, the contents of which are hereby incorporated by reference.

BACKGROUND

1. Field

Example embodiments disclosed herein relate generally to mobile electronic devices and, more particularly, to input methodologies.

2. Background Information

Numerous types of mobile electronic devices are known. Some devices have a wireless communication capability or may be capable of enabling text input or both.

For those mobile electronic devices providing text input, some such devices have featured a full keyboard such as a QWERTY keyboard wherein each key typically has assigned thereto at most a single linguistic character such as a letter. Such keys may each additionally include one or more other characters such as digits or symbols, or they may include functions and the like, or both. A QWERTY layout would be considered to constitute a full keyboard, and other full keyboard arrangements other than QWERTY (such as AZERTY, QWERTZ, and the like) are known.

For reasons of size, however, it has been desirable to provide some mobile electronic devices with a reduced keyboard wherein at least some of the keys each have a plurality of linguistic characters such as letters assigned thereto. Numerous methodologies have been developed for enabling text input and other input from devices having reduced keyboards. For instance, a multi-tap input system enables unambiguous input by detecting one or more actuations of any given key, with the quantity of actuations of the key unambiguously determining the character of the key that is intended to be input based upon the position of the character on the actuated key. Other systems system involve key chording, whether or not including simultaneous actuations of a plurality of keys, to provide an unambiguous input mechanism for a reduced keyboard.

It is also known to provide software-based text input disambiguation systems that involve comparing an ambiguous text input in the form of a number of single actuations of the keys of a reduced keyboard with words and other linguistic data that are stored in one or more dictionaries or other types of databases stored on the mobile electronic device or available thereto. Such text input disambiguation systems have generally been desirable because they enable single actuations of keys (which are inherently ambiguous due to the plurality of characters typically assigned to any given key) to be converted into text or other input without requiring the numerous additional keystrokes that otherwise would be required in an unambiguous text input system such as those mentioned above that employ multi-tap and key chording, for instance.

It is understood that limitations exist with both full keyboards and reduced keyboards. It thus would be desirable to provide an improved mobile electronic device and method that overcome these and other shortcomings.

BRIEF DESCRIPTION OF THE DRAWINGS

A full understanding of the disclosed and claimed concept can be gained from the following Description when read in conjunction with the accompanying drawings in which:

FIG. 1 is a depiction of an improved mobile electronic device in accordance with the disclosed and claimed concept being operated in a first input mode;

FIG. 2 is a schematic depiction of the mobile electronic device on FIG. 1;

FIG. 3 is a depiction of the mobile electronic device of FIG. 1 in a second input mode;

Similar numerals refer to similar parts throughout the specification.

DESCRIPTION

Figure 4:
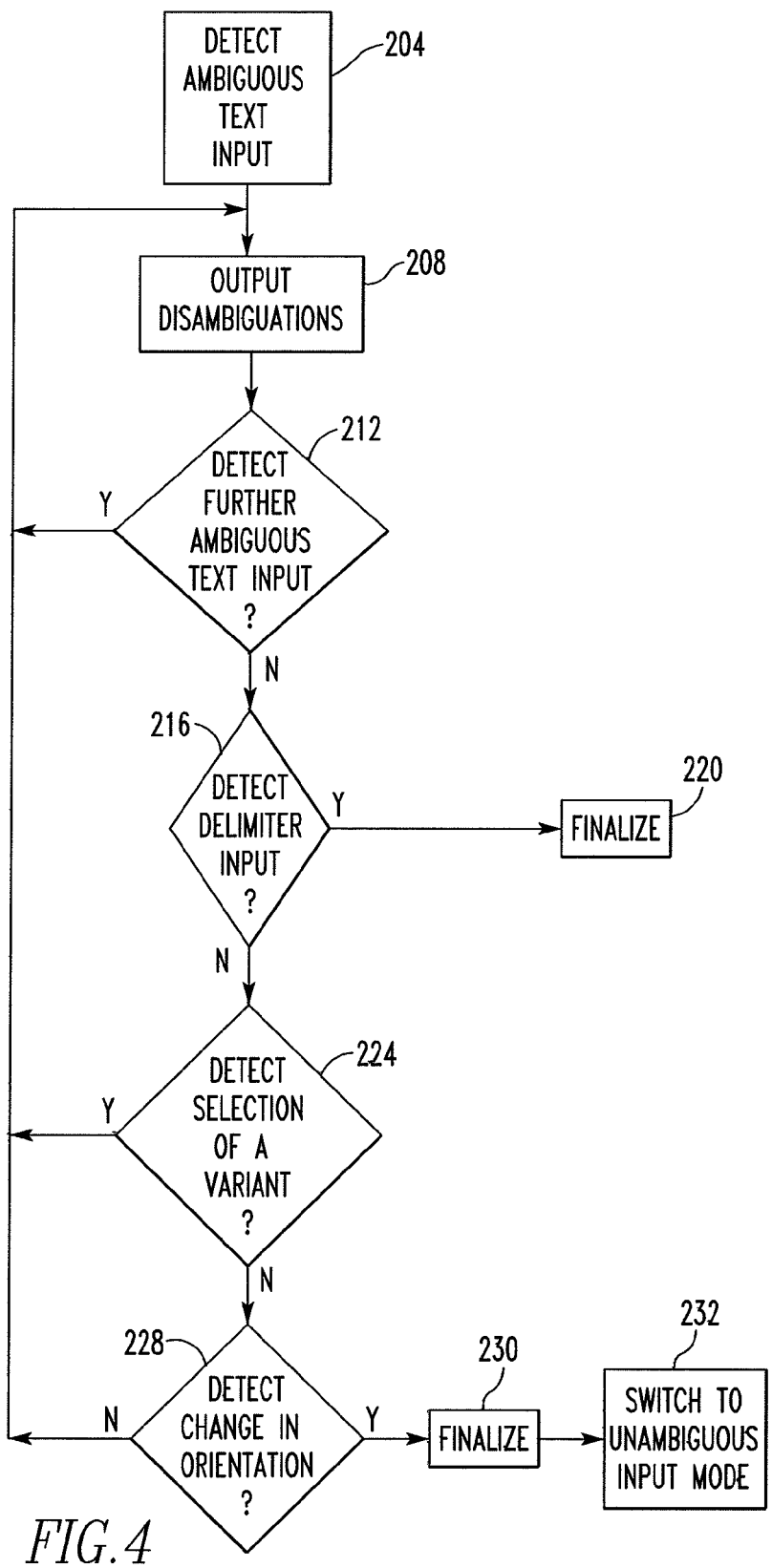
FIG. 4 is a flowchart depicting certain aspects of an improved method in accordance with the disclosed and claimed concept.

An improved mobile electronic device 4 includes a housing 8 upon which are disposed an input/output apparatus 12 and a processor apparatus 16 that are operatively connected together. The input/output apparatus 12 includes a touch sensitive display such as a touch screen 20 that provides visual output thereon and that provides input to the processor apparatus 16 when touched with, for instance, a finger or a stylus.

The processor apparatus 16 can be said to include a processor 24 such as a microprocessor or other processor and a memory 28 that are operatively connected together. The memory 28 can comprise any one or more of a variety of types of internal and external storage media such as, without limitation, RAM, ROM, EPROM, EEPROM, and the like that provide a storage register for data storage such as in the fashion of an internal storage area of a computer, that function as machine-readable storage media, and that can be volatile memory or non-volatile memory. The memory 28 has stored therein a plurality of language objects 32 in the form of words, word fragments, and other data, and additionally includes a number of routines that are generally indicated at the numeral 36. The routines 36 are executable on the processor 24 to cause the mobile electronic device 4 to perform certain functions in accordance with the disclosed and claimed concept.

The routines 36 include a disambiguation routine 40 and an unambiguous text input routine 44 among other routines 36. The disambiguation routine 40 can be any of a variety of text disambiguation systems, and in the disclosed concept is one that compares an ambiguous text input with the language objects 32 in the memory 28 to provide proposed disambiguations of the ambiguous text input. As a general matter, each disambiguation will be in the form of a string of characters, each being one character or longer, and typically will include a single character assigned to each key actuated as part of the ambiguous text input. The language objects 32 may have frequency data associated data therewith that establishes the priority of each of the proposed disambiguations with respect to one another.

The unambiguous text input routine 44 is one that functions in the form of an ordinary typewriter, i.e., each keystroke in a series of keystrokes unambiguously indicates the character that is assigned to the key. In such a system, many of the keys additionally have alternate characters such as digits, symbols, and the like that can be input by combining a keystroke with an actuation of an <ALT> key or a <SHIFT> key or both, by way of example.

The routines 36 also include a graphical user interface (GUI) which provides output on the touch screen 20 and provides input to the processor 24 responsive to touch inputs on the touch screen 20. In FIG. 1 the GUI has rendered a reduced keyboard 48 on the touch screen 20 because the mobile electronic device 4 is in the ambiguous text input mode by way of execution of the disambiguation routine 40.

The reduced keyboard 48 includes a plurality of keys 52, many of which each have a plurality of characters 56 assigned thereto. More specifically, the characters 56 include letters 60, digits 64, and the like, and many of the keys 52 of the reduced keyboard 48 have a plurality of letters 60 assigned thereto.

The electronic device 4 also comprises a device orientation subsystem 13 comprising at least one orientation sensor which is connected to the processor apparatus 16 and which is controlled by one or a combination of routines 36 and processor apparatus 16. The device orientation subsystem 13 may comprise two or more orientation sensors or an orientation sensor and an electronic compass. The device orientation subsystem 13 detects the orientation of the electronic device 4 or detects information from which the orientation of the electronic device 4 can be determined, such as acceleration using an accelerometer orientation sensor. In other embodiments, an orientation sensor other than an accelerometer could be used, such as a gravity sensor, a gyroscope, a tilt sensor, an electronic compass, or other suitable sensor, or combinations thereof.

As can be understood from FIG. 1, the mobile electronic device 4 is in a "portrait" orientation as detected by the device orientation subsystem 13, meaning that the relatively larger dimension of the touch screen 20 is oriented more or less vertically from the perspective of FIG. 1. The exemplary reduced keyboard 40 is depicted in FIG. 1 as being rendered at the lower end of the touch screen 20, and a display region 68 is disposed above the reduced keyboard 48. The display region 68 is depicted herein as having textual data output thereon, but in other embodiments additional data, objects, icons, and the like can be output in the display region 68 without departing from the present concept.

In the example depicted herein, the user is attempting to type the phrase "HAVE A NICE DAY" and more specifically is in the process of typing the word "NICE" in that phrase, having already typed the first three inputs of that word. Specifically, such three inputs would have been single actuations of the keys 52 <BN><UI><CV>, which is an ambiguous text input since each keystroke can be representative of either letter assigned to the key.

Since the disambiguation routine 40 is operative on the mobile electronic device 4 in FIG. 1, the disambiguation routine 40 has compared the ambiguous text input with some of the language objects 32 in the memory in order to provide the output depicted generally in FIG. 1. Specifically, the output in FIG. 1 includes a text input component 72 at the location on the display region 68 where text is actually being typed. The output of FIG. 1 also includes a variant component 76 disposed in the vicinity of the text input component 72 and that provides a listing of the suggested alternative disambiguations that have been identified for the ambiguous text input. For instance, the variant component 76 includes a default output 80 and a variant output 88. The default output 80 is indicated with a box 84 drawn around it and represents the most preferred of the proposed disambiguations, either due to it having the highest frequency data associated therewith or due to other factors or both. The default output 80 is also the output that is provided at the text input component 72, it being reiterated that the disambiguation routine 36 has determined that the default output 80 is the most preferred interpretation of the ambiguous text input.

The variant output 88 includes, in the embodiment depicted in FIG. 1, a plurality of variants 92 in the form of alternative disambiguations of the ambiguous text input. The default output 80 (as well as the text at the text input component 72) and the variants 92 are all in the form of strings of letters that are in an uncommitted condition, i.e., the input is still considered to be ambiguous and each of the variants 92 is considered to be a viable, selectable, and unfinalized alternative to the character string indicated as being the default output 80. Moreover, the uncommitted default output 80 and variants 92 are each subject to change based upon additional keystrokes being added to the ambiguous text input. For instance, if after typing the first three keystrokes of the word "NICE", as is indicated in FIG. 1, the user instead decided to type the phrase "HAVE A BUCKEYE DAY". In such a situation, the next keystroke in the situation depicted in FIG. 1 would be an actuation of the key 52 <JK>. In such a situation, the default output 88 may change to "BUCK" and one of the variants 92 may change to "NICK", by way of example. Thus, uncommitted disambiguations can change automatically in the event of additional keystrokes being added to the ambiguous text input.

In the ambiguous text input mode, a disambiguation can be "committed", i.e., converted from an uncommitted condition to a committed or finalized version, in any of a variety of fashions. For instance, the delimiting of an input such as by pressing <SPACE> or <ENTER> will cause whatever is the default output 80 to become committed and finalized. Alternatively, a navigational input whereby the user might select one of the variants 92 may cause the selected variant 92 to become committed and finalized, after which additional input can be received. It is noted that regardless of whether a selection of a variant 92 causes the variant 92 to become a committed portion of the input, the selected variant 92 will be output at the text input component 72 in place of whatever had been previously output at the text input component 72. Other types of inputs can be employed to commit the uncommitted disambiguation at the text input component 72 without departing from the present concept.

In accordance with the novel and inventive concept, another type of input in the form of a predetermined event can cause an uncommitted disambiguation to be converted to a committed condition. Specifically, a movement such as a rotation of the mobile electronic device 4 from the portrait orientation of FIG. 1 to a landscape orientation as in FIG. 3 automatically results in switching the input mode of the mobile electronic device 4 from the ambiguous text input mode to the unambiguous text input mode. Such movement also results in the uncommitted disambiguation at the text input component 72 to become committed. That is, a predetermined input such as the aforementioned rotation suspends the disambiguation routine 40, initiates the unambiguous text entry routine 44, and causes the uncommitted disambiguation at the text input component 72 to become a committed current text input on the touch screen 20. Such a rotation is indicated generally at the numerals 100A and 100B in FIG. 3, although types of movements of the mobile electronic device 4 and other types of predetermined inputs can be the event that triggers the switch between the ambiguous text input mode and the unambiguous text input mode.

As is further indicated in FIG. 3, and as a result of the input mode of the mobile electronic device 4 being switched to the unambiguous text input, the GUI has re-rendered the touch screen 20 to depict a full keyboard 148 in the lower region of the touch screen 20 in landscape orientation. As is generally understood, "landscape" orientation refers to the longer dimension of the touch screen 20 being oriented more or less horizontal from the perspective of FIG. 3. The full keyboard includes a plurality of keys 152, many of which have one or more characters 156 assigned thereto. Many of the keys 152 have as the characters 156 assigned thereto a single letter 160 and possibly a single digit 164 or other such character. It is understood that uppercase and lower case versions of a letter are not considered herein to constitute a plurality of characters. As a general matter, when the unambiguous text input mode is active on the mobile electronic device 4, an actuation of one of the keys 152 by a press of the touch screen 20 will cause an input of the letter 160 that is assigned to the actuated key 152 and a corresponding output of such letter 160 on the touch screen 20 at a text input component 172 depicted on a display region 168 which, in the example presented herein, is disposed above the full keyboard 148. The full keyboard 148 is wider than the reduced keyboard 48 and thus is particularly suited to the landscape orientation.

Advantageously, the novel and inventive mobile electronic device 4, method, and machine readable storage medium 44, in response to an input which switches the input mode from the ambiguous text input mode to the unambiguous text input mode, automatically commit uncommitted text by committing whatever was the uncommitted text that was output at the text input location 72 at the time of the switching. By way of example, and as is depicted generally in FIGS. 1 and 3, the uncommitted disambiguation "NIC" is depicted in FIG. 1 as being the default output 80 and is also the text displayed at the text input component 72. In FIG. 3, "NIC" has been changed from its uncommitted condition in FIG. 1 to being in a committed condition at the text input component 172. The cursor 196 that is disposed after the letter "C" at the text input component 172 indicates that further keystrokes will cause an unambiguous text input at the location of the cursor 196. It is noted that the "committed" text "NIC" at the text input component 172 is not incapable of being deleted if desired, and rather it is noted that its "committed" nature indicates that it will not itself change based upon additional keystrokes, as might be the case if the text were in the "uncommitted" condition of FIG. 1.

The claimed concept thus advantageously enables a partially entered text input in an uncommitted condition during ambiguous text input mode to be automatically committed when switching the mobile electronic device 4 to the unambiguous text input without any detected express input other than a detection of movement of the mobile electronic device 4 from a portrait orientation to a landscape orientation. The committing of uncommitted text thus enables the keystrokes of a partially entered ambiguously typed word, for instance, to be retained, i.e., to not be lost, when switching the mobile electronic device 4 from the ambiguous text input mode to the unambiguous text input mode. In this regard, this is particularly advantageous since the text in the ambiguous text input mode had been in an uncommitted condition and thus was capable of being changed with additional character input via the touch screen 20. The committing of the disambiguation at the text input component 72 results in a finalization of a proposed disambiguation, i.e., the default output 80 in the example presented herein, without requiring an expressed committing input from the user such as a delimiting input, a selection of a variant 92, and the like, thus advantageously saving input effort.

The mobile electronic device 4 can also be switched from the unambiguous text input mode in FIG. 3 back to the ambiguous text input mode of FIG. 1 when the mobile electronic device 4 is rotated from a landscape orientation to a portrait orientation. In such a situation, an unambiguously entered series of keystrokes will remain committed when the ambiguous input mode is activated on the mobile electronic device 4, although this need not necessarily be the case.

An improved method in accordance with the disclosed and claimed concept is indicated in the flowchart depicted generally in FIG. 4. The mobile electronic device 4 is being operated in the ambiguous text input mode, and an ambiguous text input such as an actuation of one of the keys 52 is detected, as at 204. At least some of the disambiguations of the ambiguous text input are displayed, i.e., output, on the touch screen 20 at the display region 68 thereof, as at 208. If a further ambiguous text input is detected, as at 212, such as would add an additional input to the existing ambiguous text input sequence, processing continues, as at 208, where further disambiguations of the ambiguous text input are displayed on the touch screen 20. Otherwise, if a delimiter input is detected, as at 216, the text that is currently being displayed at the text input component 72 will be finalized, as at 220. Otherwise, if a selection of a variant 92 is detected, as at 224, processing will continue, as at 208, where the disambiguations will be again output, albeit in a different order, with the selected variant 92 being displayed at the text input component 72. Otherwise, if a change in orientation of the mobile electronic device 4 is detected, as at 228, from the portrait orientation to the landscape orientation, the text that is currently being displayed at the text input component 72 will be finalized, as at 230, and the input mode is switched, as at 232, from the ambiguous text input mode to the unambiguous input mode.

It is also noted that other types of movements of the mobile electronic device 4 can result in the committing of uncommitted text. Such inputs may or may not additionally switch the mobile electronic device 4 from the ambiguous text input mode to the unambiguous text input mode.

What is claimed is:

1. A method of enabling input on a mobile electronic device of a type comprising an input/output apparatus that comprises a touch sensitive display, and a processor apparatus that comprises a memory having stored therein a plurality of objects including a number of routines and a number of language objects, the mobile electronic device being switchable between an ambiguous text input mode and an unambiguous text input mode, the method comprising:

operating the mobile electronic device in the ambiguous text input mode;

displaying, while in the ambiguous text input mode, a reduced keyboard on the touch sensitive display, the reduced keyboard including a plurality of virtual keys, wherein at least some of the virtual keys each has a plurality of linguistic characters assigned thereto;

detecting an ambiguous text input reflecting one or more selections of the virtual keys, wherein at least one selection corresponds to a plurality of potential linguistic characters;

outputting as uncommitted alternative character strings a plurality of proposed text disambiguations of the ambiguous text input, the plurality of proposed text disambiguations based in part on the plurality of potential linguistic characters corresponding to the at least one selection, the plurality of proposed text disambiguations comprising a default disambiguation and a number of variant disambiguations, at least some of the text disambiguations each comprising at least some of the initial characters of a language object in the memory;

switching the mobile electronic device to operate in the unambiguous text input mode in response to a predetermined event;

displaying, when switching to the unambiguous text input mode, a full keyboard on the touch sensitive display, wherein each key of the full keyboard has at most a single linguistic character; and automatically converting the default disambiguation into a committed unambiguous character string when switching from the ambiguous text input mode to the unambiguous text input mode.

2. The method claim 1, further comprising detecting a predetermined movement of the mobile electronic device as being the predetermined event.

3. The method of claim 2, further comprising detecting as the predetermined movement a rotation of the device between a portrait orientation and a landscape orientation.

4. A mobile electronic device that is switchable between an ambiguous text input mode and an unambiguous text input mode, the mobile electronic device comprising:
   an input/output apparatus that comprises a touch sensitive display; and
   a processor apparatus that comprises a processor and a memory having stored therein a plurality of objects including a number of routines and a number of language objects, the routines being executable on the processor to cause the mobile electronic device to perform operations comprising:
   operating the mobile electronic device in the ambiguous text input mode;
   displaying, while in the ambiguous text input mode, a reduced keyboard on the touch sensitive display, the reduced keyboard including a plurality of virtual keys, wherein at least some of the virtual keys each has a plurality of linguistic characters assigned thereto;
   detecting an ambiguous text input reflecting one or more selections of the virtual keys, wherein at least one selection corresponds to a plurality of potential linguistic characters;
   outputting as uncommitted alternative character strings a plurality of proposed text disambiguations of the ambiguous text input, the plurality of proposed text disambiguations based in part on the plurality of potential linguistic characters corresponding to the at least one selection, the plurality of proposed text disambiguations comprising a default disambiguation and a number of variant disambiguations, at least some of the text disambiguations each comprising at least some of the initial characters of a language object in the memory;
   switching the mobile electronic device to operate in the unambiguous text input mode in response to a predetermined event;
   displaying, when switching to the unambiguous text input mode, a full keyboard on the touch sensitive display, where each key of the full keyboard has at most a single linguistic character; and
   automatically converting the default disambiguation into a committed unambiguous character string when switching from the ambiguous text input mode to the unambiguous text input mode.

5. The mobile electronic device of claim 4 wherein the operations further comprise detecting a predetermined movement of the mobile electronic device as being the predetermined event.

6. The mobile electronic device of claim 5 wherein the operations further comprise detecting as the predetermined movement a rotation of the device between a portrait orientation and a landscape orientation.

7. A non-transitory machine readable storage medium for use with a mobile electronic device of a type comprising an input/output apparatus that comprises a touch sensitive display, and a processor apparatus that comprises a memory having stored therein a plurality of objects including a number of routines and a number of language objects, the mobile electronic device being switchable between an ambiguous text input mode and an unambiguous text input mode, machine readable storage medium having stored thereon instructions which, when executed on the processor, cause the mobile electronic device to perform operations comprising:
   operating the mobile electronic device in the ambiguous text input mode;
   displaying, while in the ambiguous text input mode, a reduced keyboard on the touch sensitive display, the reduced keyboard including a plurality of virtual keys, wherein at least some of the virtual keys each has a plurality of linguistic characters assigned thereto;
   detecting an ambiguous text input reflecting one or more selections of the virtual keys, wherein at least one selection corresponds to a plurality of potential linguistic characters;
   outputting as uncommitted alternative character strings a plurality of proposed text disambiguations of the ambiguous text input, the plurality of proposed text disambiguations based in part on the plurality of potential linguistic characters corresponding to the at least one selection, the plurality of proposed text disambiguations comprising a default disambiguation and a number of variant disambiguations, at least some of the text disambiguations each comprising at least some of the initial characters of a language object in the memory;
   switching the mobile electronic device to operate in the unambiguous text input mode in response to a predetermined event;
   displaying, when switching to the unambiguous text input mode, a full keyboard on the touch sensitive display, wherein each key of the full keyboard has at most a single linguistic character; and
   automatically converting the default disambiguation into a committed unambiguous character string when switching from the ambiguous text input mode to the unambiguous text input mode.

8. The non-transitory machine readable storage medium of claim 7 wherein the operations further comprise detecting a predetermined movement of the mobile electronic device as being the predetermined event.

9. The non-transitory machine readable storage medium of claim 8 wherein the operations further comprise detecting as the predetermined movement a rotation of the device between a portrait orientation and a landscape orientation.

* * * * *

UNITED STATES PATENT AND TRADEMARK OFFICE
CERTIFICATE OF CORRECTION

Page 1 of 1

PATENT NO. : 8,898,584 B2
APPLICATION NO. : 12/541560
DATED : November 25, 2014
INVENTOR(S) : Dan Rubanovich It is certified that error appears in the above-identified patent and that said Letters Patent is hereby corrected as shown below:

In the Claims

In Column 7, Line 5, In Claim 2, delete "method claim" and insert -- method of claim --, therefor.

Signed and Sealed this
Fourteenth Day of April, 2015

Michelle K. Lee
*Director of the United States Patent and Trademark Office*